US009862219B2

(12) United States Patent
Klein

(10) Patent No.: US 9,862,219 B2
(45) Date of Patent: Jan. 9, 2018

(54) METHOD FOR PRODUCING A MARKING

(71) Applicant: MERCK PATENT GMBH, Darmstadt (DE)

(72) Inventor: Sylke Klein, Rossdorf (DE)

(73) Assignee: MERCK PATENT GMBH, Darmstadt (DE)

( * ) Notice: Subject to any disclaimer, the term of this patent is extended or adjusted under 35 U.S.C. 154(b) by 0 days.

(21) Appl. No.: 15/106,106

(22) PCT Filed: Nov. 20, 2014

(86) PCT No.: PCT/EP2014/003100
§ 371 (c)(1),
(2) Date: Jun. 17, 2016

(87) PCT Pub. No.: WO2015/090501
PCT Pub. Date: Jun. 25, 2015

(65) Prior Publication Data
US 2016/0318325 A1    Nov. 3, 2016

(30) Foreign Application Priority Data

Dec. 17, 2013  (EP) .................... 13005863

(51) Int. Cl.
| *B41M 3/14* | (2006.01) |
| *B41M 5/26* | (2006.01) |
| *B42D 25/378* | (2014.01) |
| *B42D 25/387* | (2014.01) |
| *B41M 5/28* | (2006.01) |
| *B42D 25/41* | (2014.01) |
| *B42D 25/373* | (2014.01) |
| *C09D 11/50* | (2014.01) |
| *B42D 25/20* | (2014.01) |
| *B42D 25/23* | (2014.01) |
| *B42D 25/29* | (2014.01) |
| *C09K 11/02* | (2006.01) |
| *C09K 11/57* | (2006.01) |
| *C09K 11/58* | (2006.01) |

(52) U.S. Cl.
CPC ............ *B41M 3/144* (2013.01); *B41M 5/262* (2013.01); *B41M 5/267* (2013.01); *B41M 5/286* (2013.01); *B42D 25/20* (2014.10); *B42D 25/23* (2014.10); *B42D 25/29* (2014.10); *B42D 25/373* (2014.10); *B42D 25/378* (2014.10); *B42D 25/387* (2014.10); *B42D 25/41* (2014.10); *C09D 11/50* (2013.01); *C09K 11/025* (2013.01); *C09K 11/574* (2013.01); *C09K 11/584* (2013.01); *B41M 2205/04* (2013.01)

(58) Field of Classification Search
CPC ........ B41M 3/144; B41M 5/26; B41M 5/262; B41M 5/267; B41M 5/286; B41M 2205/04; B42D 25/378; B42D 25/387; B42D 25/415; B42D 25/435; B42D 25/315; C09D 11/50
USPC ............................................... 428/195.1, 207
See application file for complete search history.

(56) References Cited

U.S. PATENT DOCUMENTS

2011/0018252 A1    1/2011  Petry et al.
2013/0074449 A1    3/2013  Gruenler et al.

FOREIGN PATENT DOCUMENTS

WO    2009071167 A2    6/2009
WO    2011151117 A1    12/2011

OTHER PUBLICATIONS

International Search Report for PCT/EP2014/003100 dated Mar. 3, 2016.

*Primary Examiner* — Bruce H Hess
(74) *Attorney, Agent, or Firm* — Millen White Zelano and Branigan, PC; Csaba Henter; John Sopp

(57) ABSTRACT

The present invention relates to a method for producing a marking in a coating on a substrate or on the surface of a molding, where the marking represents a negative marking within a luminescent surrounding field and is generated using a laser beam, to a marking produced with the aid of the method, and to the use thereof, in particular for the labeling of products.

20 Claims, No Drawings

METHOD FOR PRODUCING A MARKING

The present invention relates to a method for producing a marking in a coating on a substrate or on the surface of a moulding, where the marking represents a negative marking within a luminescent surrounding field and is generated using a laser beam, to a marking produced with the aid of the method, and to the use thereof, in particular for the labeling of products.

The laser labeling of products of a very wide variety of types is now one of the standard methods for the individualisation of mass products, which extend over a broad range, from medical products via animal ear tags and industrial construction or housing parts to security products, to mention but a few. Readily visible, pale, dark or even coloured markings can be generated on various substrates with the aid of a laser beam.

It is also known, in various products, in particular security products, to employ luminescent, in particular fluorescent, security or labeling features which cannot be recognised by the observer without aids, but instead only become visible after exposure of the product to light of specific wavelengths and in the best case are also machine-readable. Such features can in some cases also be modified with the aid of laser beams. These luminescent security or labeling features can be designed as positive feature (the information generated by laser luminesces under suitable conditions in a non-luminescent surrounding field) or as negative feature (the information generated by laser luminesces differently from the surrounding field or does not luminesce at all in a luminescent surrounding field).

Thus, for example, EP 1 322 478 B1 describes a method for the personalisation of luminescent authenticity features in which authenticity features applied to a data carrier are personalised using a high-energy beam, where a colour-active substance present is locally bleached by means of the high-energy beam and is at the same time at least partly destroyed. The personalised authenticity features do not luminesce on excitation, a negative luminescent image becomes visible. It is claimed that the UV inks used can be applied uniformly to the data carrier as UV printing inks or incorporated into a polymeric matrix. The way in which this is to be carried out in the case of the known agglomeration and/or settling tendency of corresponding (solid) UV dyes or UV pigments is not described.

WO 02/098671 discloses a method for the application of information to an optical medium, in particular a CD, in which information on an area unit is modified using UV light. The corresponding information can be designed to be luminescent and the modification can be carried out with the aid of a UV laser. The intensity of the UV laser here is generally only sufficient for a modification, usually a weakening, of the luminescence in the regions contacted by the laser, so that on UV irradiation, a difference in the intensity in the luminescence of the lasered and unlasered regions can be observed. Use is made, in particular, of organic fluorescent dyes, which are bleached out with the aid of the laser. The way in which a homogeneous distribution of the fluorescent dyes in the respective coating composition is to be achieved is not described.

WO 2008/017300 describes a security document and document of value which contains part-regions comprising a component which has not been radiation-modified and part-regions comprising a component which has been radiation-modified, the difference between which consists merely in the beam modification and which cannot be distinguished by means of the human eye. The radiation-modified component can be, inter alia, fluorescent dyes or pigments and the radiation can be electromagnetic radiation. Examples of the radiation-modified component which are mentioned are phthalocyanines and chelate complexes of rare earths. The modification can be carried out with the aid of a laser. Although printing processes, inter alia, are mentioned for the application of the respective layers, it is not described how the radiation-modifiable components can be incorporated homogeneously into the corresponding printing inks.

WO 2011/151117 describes a method for the labeling of a substrate in which a luminescent dye in a marker layer is locally destroyed, where a negative, i.e. non-luminescent, structure is introduced into the marker layer. The deposition of the marker layer on a substrate is carried out here by means of chemical gas-phase deposition using a flame or plasma, by means of a sol-gel process or electrochemically. These deposition processes are associated with the use of complex equipment and, in particular for small-area applications, with unreasonably high costs.

The methods or products described in the said prior-art documents do not offer solutions to how finely divided luminescent dyes or pigments which have a tendency towards agglomeration and/or settling can be incorporated homogeneously into the corresponding coatings, so that uniformly strong luminescence can be achieved over the entire coated area. In addition, it is known that various, in particular inorganic, luminescent pigments have neither high chemical nor thermal stability, so that the luminescence properties of layers which comprise such luminescent pigments and are exposed to sunlight and thermal loads weaken significantly over the short or long term. In addition, doped zinc sulfides, in particular, which are frequently employed as luminescent pigments, may at least partly regain their original luminescence capability after photoinduced extinction of their luminescence due to electron exchange in the crystal lattice, which can result in considerable reduction in their recognisability and distinguishability on long-term use of negative markings.

It is therefore an object of the present invention to provide a method for producing a non-luminescent marking within a luminescent surface, which can be the surface of a moulding or a coating on a substrate, in which the luminescence capability of the area is completely extinguished permanently with the aid of a laser beam at the points to be marked without mechanically damaging the luminescent area, and in which the luminescence intensity of the luminescent area remains stable without change on corresponding excitation, even if the respective product is exposed to the influence of sunlight. Furthermore, it should be possible to distribute the luminescent constituents homogeneously in the application medium in a simple manner without agglomerate formation or settling behaviour occurring to a significant extent. In addition, the method should be suitable for producing small-area markings on mass products and should be inexpensive.

A further object of the present invention consists in providing a marking which is produced by the said method.

In addition, an object of the invention also consists in proposing the use of markings produced in this way.

The object of the present invention is achieved by a method for producing a marking in which a surface of a moulding or a coating located on a substrate, each of which comprises luminescent particles, is brought into contact with a laser beam, and in which the particles on area units of the surface or coating which are contacted by the laser beam are changed in such a way that their luminescence capability is destroyed, where the luminescent particles are included in a non-luminescent, inorganic matrix, which is in the form of pigments in the moulding or coating.

Luminescent particles in the sense of the present invention are regarded as being solid particles which have a substantially spherical or other three-dimensional, regular or irregular shape and emit visible light under the influence of electromagnetic radiation. This means that the particles employed in accordance with the invention are those which are capable of photoluminescence, in particular fluorescence. In particular, they are particles which are stimulated to emit visible light under the action of electromagnetic radiation in the ultraviolet (UV) region ($\lambda$<380 nm). They luminesce in the visible wavelength region ($\lambda$=380-780 nm) under the said conditions.

This visible light can in turn be either white (stimulation to emit over a broad wavelength spectrum) or coloured (stimulation to emit over a relatively narrowly delimited wavelength range).

Suitable materials for the luminescent particles employed in accordance with the invention are in principle all known UV fluorescent pigments, in particular those having an inorganic composition.

They can be, for example, doped or undoped metal oxides, doped metal sulfides, metal selenides, metal oxysulfides of the lanthanides or fluorescent mixed oxides, or also mixtures of two or more thereof.

Typical representatives are, for example, ZnS:Cu (Au, Al), ZnS:Ag, ZnS:Mn, $Y_2O_3$:Eu, ZnO (nanoparticles), nanocrystalline ZnSe, Gd oxysulfide, Y oxysulfide or mixed oxides, such as, for example, Ba—Mg aluminates or $Y_3Al_5O_{12}$:$Ce^{3+}$, to mention but a few.

The use of such materials as fluorescent pigments is widespread. A large number of usable substances are therefore available to the person skilled in the art. These can be used, unrestricted by their material composition, so long as they can be brought into the requisite particle size and can be incorporated into the matrix without problems. Preference is given to the use of ZnS:Cu (Au, Al), ZnS:Ag, ZnS:Mn and $Y_2O_3$:Eu.

In principle, the use of UV-fluorescent materials in encapsulated form is also possible for use in the present invention. The capsule, which serves as protective sheath, here may consist of an inorganic material or of organic polymers and is used either for protection of the UV material present in the core or for conversion of a liquid luminescent substance into a solid form which can be handled better. Such materials are also commercially available. Known UV-fluorescent dyes, which are otherwise actually present in dissolved form and can be used in encapsulated form, are, for example, coumarines, rhodamines and the like. However, preference is given to the use of the above-mentioned UV-fluorescent pigments having an inorganic composition.

In accordance with the invention, the particle size is regarded as being the greatest lateral dimension of the luminescent particles. In the case of individual particles, this can be, depending on the shape of the particles, their diameter or their greatest edge length, depending on which measurement quantity gives the greater value. If particles are in agglomerated form comprising two to at most ten individual particles, the particle size is the greatest lateral dimension of the agglomerate.

In accordance with the invention, the particle size of the luminescent particles is <1 μm, preferably 500 to 900 nm.

If the luminescent particles are in agglomerated form, their primary particle size, i.e. the size of individual particles, is less than 500 nm, in particular 50 to <400 nm. It is consequently possible to achieve a particle size of the agglomerate of <1 μm.

In accordance with the invention, the luminescent particles are included in a non-luminescent, inorganic matrix, which is in the form of pigments in the moulding or coating. The inorganic matrix is a substance composition in which the luminescent particles are embedded. This matrix is essentially transparent, i.e. transmits visible light and also the UV light required for excitation to a high proportion, i.e. to the extent of at least 90 percent of the incident amount of light and the fluorescence radiation generated.

Suitable materials for the inorganic matrix are, in particular, materials whose flowable precursor is capable of taking up the particulate material in homogeneous distribution during the preparation of the pigments, which consist of the matrix and the luminescent particles, and leaving it in this distribution during subsequent solidification, at the same time as chemical and physical stability of the material. In addition, the material used itself must not be stimulated to luminescence, of whatever type, by electromagnetic radiation.

In accordance with the invention, the inorganic matrix used preferably comprises dielectric metal oxides and/or metal oxide hydrates. In particular, these are $Al_2O_3$, $SiO_2$, silicon dioxide hydrate, aluminium oxide hydrate or mixtures of two or more thereof. The material for the matrix is particularly preferably $SiO_2$, silicon dioxide hydrate or a mixture of the two. Besides the said oxidic materials, the matrix here may optionally also comprise a small proportion of further constituents, for example surface-active substances, viscosity improvers, dispersion assistants or other assistants which are customary in coating processes, but consists of at least 90% by weight, based on the solidified matrix, of the said oxidic materials.

The matrix with the luminescent particles included therein is in the form of pigments in the moulding or in the coating located on a substrate. These pigments can per se have any outer shape which enables the inclusion of luminescent particles of the said type, but preferably have a flake shape. This means a flat structure which has on its top and bottom sides two surfaces which are approximately parallel to one another, the length and width dimension of which represents the greatest dimension of the pigment. The separation between the said surfaces, which represents the thickness of the flake, has, by contrast, a smaller dimension.

The length and width dimension of the pigment employed in accordance with the invention here is between 1 μm and 250 μm, preferably between 2 μm and 100 μm, and particularly preferably between 2 μm and 60 μm. The thickness is from 0.1 μm to 12 μm, preferably from 0.1 to less than 10 μm, particularly preferably from 0.1 μm to 5 μm and especially preferably 0.2-2 μm.

The aspect ratio of the flakes, i.e. the ratio of the greatest length or width dimension to the thickness, here is at least 2:1, but preferably at least 10:1 and very particularly preferably greater than 20:1.

In plan view of the largest area of the flake-form pigment, this can have a regular or an irregular shape.

In accordance with the invention, one or more luminescent particles of the above-mentioned type are included in the pigment. These have, as agglomerates or as individual particles, a particle size which should not exceed 1 μm. This can be achieved by selecting luminescent particles whose primary particle size is in the range 500 nm, in particular from 50 to <400 nm. Luminescent particles having a size in this order are commercially available, for example in the Lumilux® series from Honeywell. They can be employed individually or also in mixtures of various luminescent particles.

The small particle size of the luminescent particles allows reliable inclusion of these particles in the matrix and a fine and homogeneous distribution of the particles in the matrix and in the resultant pigments. In addition, it ensures sheathing of the luminescent particles with the matrix material on all sides. The latter is particularly important since this sheathing ensures the chemical stability and light stability of the luminescent particles.

The luminescent particles are present in the matrix in an amount of 1 to 80% by weight, based on the total weight of the resultant pigment. The proportion of the particles in the matrix is preferably 1 to 60% by weight and particularly preferably 10 to 50% by weight, based on the total weight of the pigment.

The pigments employed in accordance with the invention, which consist of the matrix, the luminescent particles and optionally the above-mentioned assistants, are preferably prepared by a process in which a mixture of one or more of the luminescent particles described above with a liquid or flowable precursor, which is necessary for formation of the matrix, is applied to a two-dimensional support in such a way that a uniform film forms, this film is solidified by drying, detached from the support and comminuted, so that flake-form pigments comprising a solid matrix with included particulate, luminescent material form.

If necessary, these pigments can be subjected to further drying and comminution steps and/or calcination steps.

Such processes are known per se and are generally carried out in a belt plant. For formation of a solid matrix, it may be necessary here to treat the solidified precursor film with water, acid and/or caustic lye in order to obtain a stable matrix. The sequence in which the particulate materials are added to the precursor is generally unimportant. The mixing of precursor and particulate materials can also be carried out directly on the two-dimensional support. Owing to the wetting of the luminescent particles with the matrix on all sides, however, prior mixing with the precursor is preferred.

Suitable starting materials (precursor) for the matrix for the preparation of the pigments employed in accordance with the invention are, in particular, sodium water-glass and potassium water-glass and hydrolysable aluminium compounds. Corresponding processes are described in EP 608 388 and in WO 2009/071167. The contents of these publications should therefore be incorporated here to this extent.

The pigments which comprise the luminescent particles can be incorporated in a simple manner without major difficulties into common binder systems or converted into polymeric mouldings in a mixture with polymer granules or emulsions. They are compatible with the common polymers and binder systems and can be processed in a similar manner to conventional interference pigments, about the processing properties of which the users have adequate expert knowledge. They have a low settling tendency and/or a good stirring-up behaviour in binder systems and can be incorporated homogeneously into the corresponding application systems. The inorganic matrix at the same time ensures a concentration of luminescent particles in the respective pigments, which as such have particularly high luminosity on corresponding excitation, but on the other hand also ensures a corresponding protective action against chemical and photoinduced ambient influences on the luminescent particles. At the same time, it prevents recombination of electrons in the preferably inorganic particles, so that their luminescence capability is permanently switched off by the laser beam and restoration of the luminescence capability is not possible.

By contrast, the small particle size of the luminescent particles located in the matrix guarantees good contrast and precise edge sharpness of the marking to be applied by the laser.

For the production of a moulding which comprises pigments which comprise the luminescent particles included in a matrix, it is possible to use all polymeric materials which are generally also suitable for processing with interference pigments. These materials and the additives, absorption pigments, fillers and/or assistants optionally added should, however, themselves be laser-transparent, i.e. not laser-active, and should not change on exposure to laser beams. Examples which may be mentioned here are polymers and copolymers based on polyolefins, polyesters, polystyrenes, polycarbonates, or also some PMMA types.

However, the method according to the invention is particularly preferably employed for products in which a luminescent coating is located on a substrate.

Suitable possible substrates here are, for example, polymeric materials, such as polymer films, cellulose-containing materials, such as coated or uncoated papers, cardboards, kraft liner, paper composite materials, wallpapers or banknote papers, glass, ceramic or metals.

A coating, which generally also comprises at least one binder besides the pigments described comprising matrix and luminescent particles, is applied to these substrates and solidified. The coating composition employed for the coating may of course also comprise solvents and/or assistants and additives which are usually employed in coating compositions and therefore need not be explained in greater detail here.

Binders which may be mentioned by way of example are those based on cellulose or based on acrylate.

The coating composition can be applied to the respective substrate using a multiplicity of known coating processes, which are not essentially limited by the particle sizes of solid constituents or are highly suitable per se for the coating of particulate coating compositions. Such processes are, for example, printing processes of a very wide variety of types, spray processes, roll processes or the spin-coating process. The only limiting factor here is the particle size of the pigments employed which comprise the luminescent particles.

Particular preference is given to the use of the various printing processes, in particular screen-printing processes, gravure and flexographic printing processes and the paper-coating process. The coating on the substrate is therefore preferably applied thereto in the form of a printing ink and subsequently solidified. If the solidification is to be carried out by UV curing, it must be ensured that the wavelength range employed here does not result in permanent impairment of the luminescence properties of the luminescent particles integrated into the coating.

The concentration of the pigments which comprise the luminescent particles in the respective application medium is between 1 and 40% by weight, based on the weight of the moulding or the weight of the coating on a substrate. The concentration in a moulding is more likely 1-25% by weight, whereas the concentration in a coating is usually in the range from 10 to 40% by weight.

The thickness of the coating on the substrate is dependent on the respective coating method and can vary in the range from a few microns (from about 3 µm) to several millimeters (up to about 5 mm). Coatings which have a layer thickness greater than 5 mm can themselves also be referred to as mouldings for the purposes of the invention.

The marking according to the invention is written into the mouldings comprising the luminescent particles in the pigment-form matrix or into the corresponding coating on a substrate with the aid of a laser. Preference is given here to the use of UV lasers having the wavelengths 355 nm, 266 nm, 224-272 nm, but also IR lasers having the wavelength 1064 nm. The conventional equipment available on the market can be employed. The lasers are preferably operated in pulsed mode, in particular at pulse frequencies of 10-50 kHz.

With the aid of the laser beam, the luminescent particles which are included in the pigments and which are touched by the laser at the surface of the moulding or coating are changed in such a way that their luminescence capability is permanently destroyed. The crystal structure of the inorganic particles is not destroyed. Thus, the crystals of the doped zinc oxides or zinc sulfides can still be recognised as such in a UV microscope, while the luminescence property has completely disappeared after exposure to the laser. Although the precise causes for this have not been clarified, it is thought that the influence of the laser causes the doping elements in the corresponding compounds to migrate from their traditional lattice sites towards flaws in the crystal structure, so that the crystal structure as such is retained, but luminescence is no longer possible. The inclusion of the luminescent particles in the inorganic matrix which is itself not capable of luminescence means that restoration of the luminescence capability in the lasered surface regions is also no longer possible. The contrast between surroundings which are luminescent on corresponding excitation and marking which is no longer luminescent can thus be maintained permanently, even if the marked product were to be exposed to sunlight or heating over an extended time.

In the case where the marking according to the invention is to be applied within a coating on a substrate, it is particularly advantageous that, in the case of the presence of laser-transparent substrates, such as glass or various plastic films, the marking can also take place through the corresponding substrate from the back, i.e. from the uncoated surface. This may under certain circumstances significantly simplify the marking operation in technological or logistical terms.

The present invention also relates to a marking on the surface of a moulding or of a coating located on a substrate which has a non-luminescent structure within a luminescent area unit, produced by the method described above.

In particular, the luminescent area unit is an area which is capable of photoluminescence, i.e. emits electromagnetic radiation on excitation by electromagnetic radiation. The luminescent area unit is particularly preferably excited by electromagnetic radiation in the UV wavelength region and itself emits visible light. The emitted light here can be white or coloured.

The area unit is the surface or parts of a surface of a moulding or of a coating on a substrate. The size of the respective area unit only plays a subordinate role here. It should be at least sufficiently large that a marking applied therein can be generated by laser beam and subsequently distinguished from the luminescent surrounding field on excitation by electromagnetic radiation. They are usually area units in the range from a few square millimeters to a few hundred square centimeters. However, the marked area units may also, if necessary, cover several square meters.

The size of the negative marking generated by the laser beam is also variable and can extend from microprinting or the data matrix code having sizes in the order of the micron region to large-area markings in the region of square centimeters. The actual size is dependent on the laser type used, the diameter of the focused laser beam on the surface and the respective application of the marking.

Due to the concentrated presence of luminescent particles within pigments which consist of the matrix and the luminescent particles, the luminosity of the luminescent area unit is high, even if the concentration of the luminescent pigments which comprise the luminescent particles in the moulding or coating is only comparatively low. The proportion of luminescent particles in the moulding or in the coating can thus be significantly reduced for the same luminosity compared with colouring with pure, commercially available luminescent pigments. In addition, the inorganic matrix in the pigments employed in accordance with the invention ensures uniform distribution of these pigments in the application medium, so that the luminosity is also distributed uniformly over the entire application medium.

The marking generated using the laser beam has a precise edge structure, exhibits absolutely no luminescence on excitation with electromagnetic radiation and stands out dark from the respective luminescent background without the substrate being damaged or blackened by the laser beam.

Apart from the modified luminescence property, the respective coating or the surface of the moulding experiences absolutely no visible change due to the marking method according to the invention, in particular the surface is not ablated, a three-dimensional structure therefore does not arise.

The non-luminescent structure generated by the method according to the invention can have various forms, which are limited only by the technical possibilities of the respective laser equipment used and the corresponding need. It can be alphanumeric symbols or a sequence of alphanumeric symbols in various sizes (from microtexts to macroinscriptions) or equally logos, symbols, patterns, graphical elements, pictures, line structures, bar codes or so-called data matrix codes, to mention but a few examples.

These are not visible with the naked eye under normal light conditions (sunlight or daylight or artificial light) and can only be recognised after excitation of the marked area with electromagnetic radiation of a certain wavelength, preferably in the UV region, as non-luminous (negative) structure within a luminescent surrounding field. The marking generated is consequently hidden information which is only accessible to the informed observer and/or is also machine-readable. The marking generated can be read out, for example, by machine by means of a corresponding UV unit, consisting of UV light source/UV optics and CCD camera.

The present invention therefore also relates to the use of the marking generated by the method according to the invention for the labeling of products, in particular for the hidden labeling of products. It is possible to label virtually all products which can either themselves be marked by means of the method described above or can be provided permanently or temporarily with labels or other marked area units. The range of products capable of being labeled is very large. They can be, for example, consumer goods, industrial goods, electronic articles, clothing, packaging materials or also security products.

Security products here are taken to mean, inter alia, banknotes, cheques, bank and credit cards, cheque cards, securities, documents such as identity cards, certificates, examination certificates, revenue stamps and postage stamps, identification cards, rail and air tickets, entry tickets, telephone cards, labels or inspection marks.

The invention will be explained below with reference to examples, but is not restricted thereto.

EXAMPLE 1 a)

Pigments which have an SiO$_2$ matrix in which luminescent particles comprising ZnS:Cu are included are prepared by the process described in WO 2009/071167, Example 1. In contrast to Example 1 from WO 2009/071167, however, ZnS:Cu particles whose primary particle size is less than 400 nm (Lumilux Green CD 179 FSI from Honeywell) are used. The UV-luminescent pigments obtained have a particle size in the range 2-60 μm and green UV luminescence (fluorescence).

b)

The procedure as under a) is followed with the difference that ZnS:Mn particles (Lumilux Orange CD 181 FSI from Honeywell) having a primary particle size of less than 400 nm are incorporated into the SiO$_2$ matrix. An orange-red-luminescent pigment having a particle size in the range 2-60 μm is obtained.

A gravure-printing ink is prepared from 90% by weight of an NC (nitro-cellulose) varnish (NC varnish 2001, Siegwerk) and 10% by weight of the green-fluorescent pigments from Example 1)a and applied to an optically transparent and laser-transparent plastic film (polyester or OPP (oriented polypropylene) film) in the gravure-printing process.

The printed plastic films are laser-marked using lasers of the wavelengths 1064 nm or 355 nm. Both alphanumeric symbols and data matrix codes are written in. In each case, edge-sharp labels without fluorescence capability are obtained, irrespective of whether the laser structuring is carried out from the coated or uncoated side of the plastic film. Apart from a dark, sharp marking on green-fluorescent film under excitation by UV light, the marked area has absolutely no changes or damage under normal conditions (daylight).

The following conditions are preferred:
IR laser (neodymium-yttrium vanadate solid-state laser, 12 W)
Wavelength: 1064 nm
Laser mode: pulsed (Q switch)
Power: 80-95%
Pulse frequency: 10-30 kHz
Speed: 300-600 mm/s UV laser (frequency-tripled neodymium-yttrium vanadate solid-state laser)
Wavelength: 355 nm
Laser mode: pulsed (Q switch)
Power: 80-95%
Pulse frequency: 10-30 kHz
Speed: 1000-3000 mm/s Depending on the plastic material used and the layer thickness of the coating, the laser marking can also be carried out up to 7 mm on both sides of the laser focus in order reliably to prevent laser ablation of the coating.

EXAMPLE 2

A screen-printing ink is prepared from 10% by weight of the green-fluorescent pigment according to Example 1)a and 90% by weight of a screen-printing varnish (FGLM from Pröll).

In the same way, a screen-printing ink is prepared from 10% by weight of the orange-red-fluorescent pigment according to Example 1)b and 85% by weight of a screen-printing varnish (Noripet 093 from Pröll) and 5% by weight of thinner (Noripet 090 from Pröll).

Both screen-printing inks are in each case applied to metallic mobile telephone shells in the screen-printing process and, after solidification of the print layer, subsequently provided with a marking by laser.

The following laser conditions have proven particularly preferred:
UV laser (frequency-tripled neodymium-yttrium vanadate solid-state laser)
Wavelength: 355 nm
Laser mode: pulsed (Q switch)
Power: 80-95%
Pulse frequency: 10-30 kHz
Speed: 1000-3000 mm/s Here too, the laser marking can be carried out slightly away from the laser focus in order reliably to avoid laser ablation of the coating.

Edge-sharp, permanent markings are obtained which are invisible under normal light conditions (daylight) and represent non-fluorescent markings which are readily visible under UV light within green- or orange-red-fluorescent surroundings.

The marked area regions have absolutely no visible changes under daylight.

The invention claimed is:

1. A method for producing a marking on a surface of a moulding or a coating located on a substrate, each of which comprises luminescent particles, comprising bringing said surface or coating into contact with a laser beam, wherein the particles on area units of the surface or coating which are contacted by the laser beam are changed in such a way that their luminescence capability is destroyed, wherein the luminescent particles are included in a non-luminescent, inorganic matrix, which is in the form of pigments in the moulding or coating, and wherein the inorganic matrix comprises dielectric metal oxides and/or metal oxide hydrates.

2. The method according to claim 1, wherein the dielectric metal oxides are Al$_2$O$_3$, SiO$_2$, silicon dioxide hydrate, aluminium oxide hydrate or mixtures of two or more thereof.

3. The method according to claim 1, wherein the inorganic matrix is in the form of a flake-form pigment.

4. The method according to claim 1, wherein the pigment comprises one or more luminescent particles having a primary particle size of ≤500 nm.

5. The method according to claim 4, wherein the pigment comprises luminescent particles which have a particle size of ≤1 μm.

6. The method according to claim 1, wherein the luminescent particles are stimulated to luminescence in the UV wavelength region and emit visible light.

7. The method according to claim 1, wherein the luminescent particles consist of inorganic materials.

8. The method according to claim 6, wherein the luminescent particles consist of doped or undoped metal oxides, doped metal sulfides, metal selenides, metal oxysulfides of the lanthanides or fluorescent mixed oxides, or of mixtures of two or more thereof.

9. The method according to claim 1, wherein the moulding consists of polymeric material.

10. The method according to claim 1, wherein the substrate consists of a polymeric material, a cellulose-containing material, glass, ceramic or metal.

11. The method according to claim 1, wherein the coating comprises a binder.

12. The method according to claim 1, wherein the coating is applied to the substrate in the form of a printing ink and solidified.

13. A marking on the surface of a moulding or of a coating located on a substrate which has a non-luminescent structure within a luminescent area unit, produced by the method according to claim 1.

14. The marking according to claim 13, wherein the luminescent area unit is stimulated to luminescence under the action of electromagnetic radiation in the UV wavelength region and emits light in the visible wavelength region.

15. The marking according to claim 13, wherein the non-luminescent structure is an alphanumeric symbol or a sequence of alphanumeric symbols, a logo, a symbol, a pattern, a graphical element, a picture, a line structure, a bar code or a data matrix code.

16. A labelling of a product comprising a marking on the surface of a moulding or of a coating located on a substrate according to claim 13.

17. The labelling of a product according to claim 16, wherein the products are consumer goods, industrial goods, electronic articles, clothing, packaging materials or security products.

18. A method for producing a marking on a surface of a moulding or a coating located on a substrate, each of which comprises luminescent particles, comprising bringing said surface or coating into contact with a laser beam, wherein the particles on area units of the surface or coating which are contacted by the laser beam are changed in such a way that their luminescence capability is destroyed, wherein the luminescent particles are included in a non-luminescent, inorganic matrix, which is in the form of pigments in the moulding or coating, and wherein at least one of the following is satisfied:

the inorganic matrix is in the form of a flake-form pigment, or the luminescent particles consist of inorganic materials, or the luminescent particles are stimulated to luminescence in the UV wavelength region and emit visible light, and said luminescent particles consist of doped or undoped metal oxides, doped metal sulfides, metal selenides, metal oxysulfides of the lanthanides or fluorescent mixed oxides, or of mixtures of two or more thereof, or the coating is applied to the substrate in the form of a printing ink and solidified.

19. A marking on the surface of a moulding or of a coating located on a substrate which has a non-luminescent structure within a luminescent area unit, produced by the method according to claim 18.

20. A labelling of a product comprising a marking on the surface of a moulding or of a coating located on a substrate according to claim 19.

* * * * *